United States Patent
Hu (10) Patent No.: US 12,022,237 B2
(45) Date of Patent: Jun. 25, 2024

(54) VEHICLE-MOUNTED CONTROL UNIT, AND METHOD AND APPARATUS FOR FPGA BASED AUTOMATIC DRIVING OF VEHICLE

(71) Applicant: Apollo Intelligent Driving Technology (Beijing) Co., Ltd., Beijing (CN)

(72) Inventor: Jiayue Hu, Beijing (CN)

(73) Assignee: Apollo Intelligent Driving Technology (Beijing) Co., Ltd., Beijing (CN)

( * ) Notice: Subject to any disclaimer, the term of this patent is extended or adjusted under 35 U.S.C. 154(b) by 692 days.

(21) Appl. No.: 17/024,137

(22) Filed: Sep. 17, 2020

(65) Prior Publication Data

US 2021/0001880 A1 Jan. 7, 2021

Related U.S. Application Data

(63) Continuation of application No. PCT/CN2019/129248, filed on Dec. 27, 2019.

(30) Foreign Application Priority Data

Dec. 28, 2018 (CN) .......................... 201811625816.8
Jan. 7, 2019 (CN) .......................... 201910013122.7

(51) Int. Cl.
*H04N 7/18* (2006.01)
*B60W 60/00* (2020.01)
(Continued)

(52) U.S. Cl.
CPC .......... *H04N 7/183* (2013.01); *B60W 60/001* (2020.02); *G01S 13/867* (2013.01);
(Continued)

(58) Field of Classification Search
CPC .......... H04N 7/183; H04N 7/185; H04N 7/18; B60W 60/001; B60W 2420/42;
(Continued)

(56) References Cited

U.S. PATENT DOCUMENTS

| 10,003,554 B1 | 6/2018 | Zidenberg et al. |
| 2010/0063664 A1 | 3/2010 | Anderson |

(Continued)

FOREIGN PATENT DOCUMENTS

| CN | 101750972 A | 6/2010 |
| CN | 105335327 A | 2/2016 |

(Continued)

OTHER PUBLICATIONS

Extended European Search Report for corresponding European patent application No. 19903938.9 dated Apr. 4, 2022, nine pages.

(Continued)

*Primary Examiner* — Donald J Wallace
(74) *Attorney, Agent, or Firm* — Harness, Dickey & Pierce, P.L.C.

(57) ABSTRACT

Embodiments of the present disclosure provide a vehicle-mounted control unit, and a method and an apparatus for FPGA based automatic driving of a vehicle, which includes a MCU and a first SoC implemented by being integrated with an ARM through the FPGA, where the vehicle-mounted control unit is set on an automatic driving vehicle, the FPGA of the first SoC receives video data sent by a vehicle-mounted camera, performs visual perception on the video data by using a first neural network algorithm to obtain first perception information; and sends the first perception information to the ARM of the first SoC. The ARM of the first SoC processes the first perception information to obtain first decision information, and sends the first decision information to the MCU. Finally, the MCU generates a control command according to the first decision information and sends it to the corresponding execution mechanism.

10 Claims, 4 Drawing Sheets

(51) Int. Cl.
  *G01S 13/86* (2006.01)
  *G05D 1/00* (2006.01)
  *G06N 3/08* (2023.01)
  *G06V 10/764* (2022.01)
  *G06V 10/80* (2022.01)
  *G06V 10/82* (2022.01)
  *G06V 20/40* (2022.01)
  *G06V 20/56* (2022.01)

(52) U.S. Cl.
  CPC ......... *G05D 1/0088* (2013.01); *G05D 1/0251* (2013.01); *G05D 1/0255* (2013.01); *G05D 1/0257* (2013.01); *G06N 3/08* (2013.01); *G06V 10/764* (2022.01); *G06V 10/80* (2022.01); *G06V 10/82* (2022.01); *G06V 20/40* (2022.01); *G06V 20/56* (2022.01); *H04N 7/185* (2013.01); *B60W 2420/403* (2013.01); *B60W 2420/408* (2024.01)

(58) Field of Classification Search
  CPC .. B60W 2420/52; G01S 13/867; G01S 15/86; G01S 17/931; G01S 2013/9323; G01S 2013/9324; G01S 13/931; G01S 15/931; G05D 1/0088; G05D 1/0251; G05D 1/0255; G05D 1/0257; G05D 2201/0213; G05D 1/0246; G06N 3/08; G06N 3/045; G06N 3/063; G06N 3/02; G06V 10/764; G06V 10/80; G06V 10/82; G06V 20/40; G06V 20/56; G06F 18/25; G06F 30/331
  See application file for complete search history.

(56) References Cited

U.S. PATENT DOCUMENTS

| | | | |
|---|---|---|---|
| 2010/0063672 | A1 | 3/2010 | Anderson |
| 2013/0151088 | A1 | 6/2013 | Ricci |
| 2014/0267727 | A1 | 9/2014 | Alaniz |
| 2015/0051763 | A1 | 2/2015 | Enomoto et al. |
| 2015/0169238 | A1* | 6/2015 | Lee .................... G06F 12/0871 711/103 |
| 2017/0004063 | A1 | 1/2017 | Broderick et al. |
| 2018/0093538 | A1 | 4/2018 | Rothschild |
| 2018/0143633 | A1 | 5/2018 | Paryani et al. |
| 2018/0268092 | A1 | 9/2018 | Luo et al. |
| 2018/0284256 | A1 | 10/2018 | Sutou et al. |
| 2018/0297606 | A1 | 10/2018 | Luo et al. |
| 2018/0348763 | A1 | 12/2018 | Jiang et al. |
| 2019/0162782 | A1* | 5/2019 | Shanbhogue .... G01R 31/31721 |
| 2019/0204893 | A1* | 7/2019 | Rotem ................ G06F 11/3024 |
| 2020/0116495 | A1 | 4/2020 | Yasui et al. |

FOREIGN PATENT DOCUMENTS

| | | |
|---|---|---|
| CN | 107404529 A | 11/2017 |
| CN | 107561969 A | 1/2018 |
| CN | 107885214 A | 4/2018 |
| CN | 108037756 A | 5/2018 |
| CN | 108162977 A | 6/2018 |
| CN | 108196547 A | 6/2018 |
| CN | 108205279 A | 6/2018 |
| CN | 108357374 A | 8/2018 |
| CN | 108363670 A | 8/2018 |
| CN | 108445885 A | 8/2018 |
| CN | 108462726 A | 8/2018 |
| CN | 108508882 A | 9/2018 |
| CN | 108614790 A | 10/2018 |
| CN | 108776472 A | 11/2018 |
| CN | 109814552 A | 5/2019 |
| JP | 2008021034 A | 1/2008 |
| JP | 2017182771 A | 10/2017 |
| KR | 20180097247 A | 8/2018 |
| NL | 2007104 C2 | 9/2012 |
| WO | 2014160186 A1 | 10/2014 |
| WO | 2017057056 A1 | 4/2017 |
| WO | 2018230492 A1 | 12/2018 |

OTHER PUBLICATIONS

Office Action for corresponding Japanese patent application No. 2020-572668 dated Feb. 28, 2022, with English translation, eight pages.
Office Action for corresponding Korean patent application No. 10-2020-7024742, dated Jan. 18, 2022, with English translation, 18 pages.
Altera: "What is an SoC FPGA?", XP055904725, Dec. 31, 2014, pp. 1-4.
International Search Report and Written Opinion of the International Searching Authority, issued in PCT/CN2019/129248, dated Mar. 30, 2020; ISA/CN.
Notice of Reasons for Refusal in corresponding Japanese Patent Application No. 2020-572668 dated Oct. 19, 2022.
Office Action dated Sep. 4, 2023, in corresponding Chinese Application No. 201910013122.7 (with English translation).
Chinese Notification to Grant Patent Right for Invention regarding Patent Application No. 201910013122.7, dated Mar. 19, 2024.
Gang, et al.; Hardware design of Driver Assistance System Base on ADSP-BF561; Doctoral Forum, Beijing Institute of Technology; Received: Oct. 22, 2008; Revised: Jan. 22, 2009. (including English machine translation).

* cited by examiner

VEHICLE-MOUNTED CONTROL UNIT, AND METHOD AND APPARATUS FOR FPGA BASED AUTOMATIC DRIVING OF VEHICLE

CROSS-REFERENCE TO RELATED APPLICATION

This application is a continuation of International Application No. PCT/CN2019/129248, filed on Dec. 27, 2019, which claims priority to Chinese Patent Application No. 201811625816.8, filed to the China National Intellectual Property Administration on Dec. 28, 2018, with the applicant being Baidu Online Network Technology (Beijing) Co., Ltd., and entitled "Vehicle-Mounted Control Unit, and Method and Apparatus for FPGA based Automatic Driving of Vehicle", and Chinese Patent Application No. 201910013122.7, filed to the China National Intellectual Property Administration on Jan. 7, 2019, with the applicant being Baidu Online Network Technology (Beijing) Co., Ltd., and entitled "Vehicle-Mounted Control Unit, and Method and Apparatus for FPGA based Automatic Driving of Vehicle", the contents of which are incorporated herein by reference.

TECHNICAL FIELD

Embodiments of the present disclosure relate to the field of vehicle control technology, and in particular, to a vehicle-mounted control unit, and a method and an apparatus for a field programmable gate array (FPGA) based automatic driving of a vehicle.

BACKGROUND

An automatic driving vehicle, also known as an unmanned vehicle, a computer-driving vehicle, or a wheeled mobile robot, is an intelligent vehicle that achieves unmanned driving through a computer system.

An electronic control unit (ECU) is installed on the automatic driving vehicle. The ECU is also called a trip computer and a vehicle-mounted computer, which is a "brain" of the unmanned vehicle. In a process of automatic driving, a vehicle-mounted camera is used to collect the surrounding information of the automatic driving vehicle, and the collected information is sent to the ECU. The ECU uses a perception algorithm to perform a visual perception on the received information to generate a decision result, and generates a control command according to the decision result, thereby completing the automatic driving according to the control command.

In the above-mentioned automatic driving process, a visual perception for the information collected by the vehicle-mounted camera through the perception algorithm relies heavily on the ECU, which results in an increased burden of the ECU.

SUMMARY

Embodiments of the present disclosure provide a vehicle-mounted control unit, and a method and an apparatus for FPGA based automatic driving of a vehicle. A first system on chip (SoC) is integrated with an ARM through the FPGA, and the sensor data is processed by the FPAG and the ARM and then is sent to a micro control unit (MCU) to reduce a burden of the MCU.

A first aspect of an embodiment of the present disclosure provides an method for FPGA based automatic driving of a vehicle, suitable for a vehicle-mounted control unit, where the vehicle-mounted control unit includes a first system on chip (SoC) and a micro control unit (MCU), the first SoC is integrated with an advanced reduced instruction set computer machine (ARM) through the FPGA, and the vehicle-mounted control unit is set on an automatic driving vehicle, where the method includes:

receiving, by the FPGA of the first SoC, video data sent by a vehicle-mounted camera;
performing, by the FPGA of the first SoC, visual perception on the video data by using a first neural network algorithm to obtain first perception information;
sending, by the FPGA of the first SoC, the first perception information to the ARM of the first SoC; and
processing, by the ARM of the first SoC, the first perception information to obtain first decision information, and sending the first decision information to the MCU.

In a feasible design, the processing, by the ARM of the first SoC, the first perception information to obtain first decision information, and sending the first decision information to the MCU includes:

receiving radar data by the ARM of the first SoC;
merging, by the ARM of the first SoC, the first perception information and the radar data; and
processing, by the ARM of the first SoC, the merged first perception information and the radar data to obtain the first decision information, and sending the first decision information to the MCU.

In a feasible design, the radar data includes at least one of ultrasonic radar data, millimeter wave radar data, and lidar data.

In a feasible design, the vehicle-mounted control unit further includes: a second system on chip (SoC), and the second SoC is integrated with the advanced reduced instruction set computer machine ARM through the FPGA, where the method further includes:

receiving, by the FPGA of the second SoC, the video data sent by the vehicle-mounted camera;
performing, by the FPGA of the second SoC, visual perception on the video data by using a second neural network algorithm to obtain second perception information;
sending, by the FPGA of the second SoC, the second perception information to the ARM of the second SoC;
processing, by the ARM of the second SoC, the second perception information to obtain second decision information, and sending the second decision information to the MCU; and
generating, by the MCU, a control command according to the first decision information and the second decision information.

A second aspect of an embodiment of the present disclosure provides a vehicle-mounted control unit, which includes: a first system on chip (SoC); and a micro control unit (MCU), where the first SoC is integrated with an advanced reduced instruction set computer machine (ARM) through a field programmable gate array FPGA, and the first SoC is connected to the MCU through an Ethernet switching chip.

In a feasible design, the above mentioned vehicle-mounted control unit further includes: a second system on chip (SoC), on which the FPGA and the ARM are provided, where the FPGA and the ARM on the second SoC are connected through a bus, and the second SoC is connected to the MCU through the Ethernet switching chip.

In a feasible design, the above mentioned vehicle-mounted control unit further includes: a first synchronous dynamic random access memory (SDRAM) and a first flash memory (Flash), where the first SDRAM is connected to the first SoC, and the first Flash is connected to the first SoC.

A third aspect of an embodiment of the present disclosure provides an automatic driving apparatus, where the apparatus is suitable for a vehicle-mounted control unit, and the automatic driving apparatus includes: a first system on chip SoC module and a micro control unit MCU module, the first SoC module is integrated with an advanced reduced instruction set computer machine ARM by a FPGA, the vehicle-mounted control unit is set on an automatic driving vehicle, and the first SoC includes a first FPGA unit and a first ARM unit, wherein, the first FPGA unit is configured to receive video data sent by a vehicle-mounted camera, perform visual perception on the video data by using a first neural network algorithm to obtain first perception information, and send the first perception information to the ARM of the first SoC; and the first ARM unit is configured to process the first perception information to obtain first decision information, and send the first decision information to the MCU module.

In a feasible design, the first ARM unit is specifically configured to receive radar data, merge the first perception information and the radar data, process the merged first perception information and the radar data to obtain first decision information, and send the first decision information to the MCU.

In a feasible design, the apparatus further includes: a second SoC module, and the second SoC module includes a second FPGA unit and a second ARM unit, wherein, the second FPGA unit is configured to receive the video data sent by the vehicle-mounted camera, perform visual perception on the video data by using a second neural network algorithm to obtain second perception information, and send the second perception information to the ARM of the second SoC;

the second ARM unit is configured to process the second perception information to obtain second decision information, and send the second decision information to the MCU; and the MCU module is configured to generate a control command according to the first decision information and the second decision information.

The embodiments of the present disclosure provide a vehicle-mounted control unit, and a method and an apparatus for FPGA based automatic driving of a vehicle, where the vehicle-mounted control unit includes a MCU and a first SoC implemented by being integrated with an ARM through the FPGA, and the vehicle-mounted control unit is set on an automatic driving vehicle. During the process of the automatic driving, the FPGA of the first SoC receives video data sent by a vehicle-mounted camera; perform visual perception on the video data by using a first neural network algorithm to obtain first perception information; and sends the first perception information to the ARM of the first SoC. The ARM of the first SoC processes the first perception information to obtain first decision information and sends the first decision information to the MCU. Finally, the MCU generates a control command according to the first decision information and sends it to a corresponding execution mechanism, so that the execution mechanism performs automatic driving according to the control command. In this process, the first SoC is integrated with the ARM through the FPGA, and the sensor data is sent to the MCU after being processed by the FPGA and the ARM, so as to reduce the burden of the MCU.

BRIEF DESCRIPTION OF DRAWINGS

In order to more clearly illustrate the embodiments of the present disclosure or the technical solutions in the prior art, the drawings required in the embodiments or the description of the prior art will be briefly introduced below. Obviously, the drawings described in the following description are some embodiments of the present disclosure. For those of ordinary skilled in the art, other drawings may be also obtained based on these drawings without any creative effort.

DESCRIPTION OF EMBODIMENTS

The technical solutions of the embodiments of the present disclosure will be described clearly and completely in conjunction with the drawings of the embodiments of the present disclosure. Apparently, the described embodiments are only part of the embodiments of the present disclosure, rather than all of the embodiments. Based on the embodiments of the present disclosure, all other embodiments obtained by those of ordinary skilled in the art without creative effort will fall within the protection scope of the present disclosure.

The terms "first", "second", "third", "fourth" and the like (if present) in the description, claims and the above drawings of the present disclosure are used to distinguish similar objects, and are not necessarily used to describe a particular order or sequence. It should be understood that the data used in this way may be interchanged as appropriate, so that the embodiments of the present disclosure described herein may be implemented in a sequence other than those illustrated or described herein. In addition, the terms "comprise", and "include" and any variations thereof are intended to cover a non-exclusive inclusion, for example, a process, a method, an system, a product or a device that comprises a series of steps or units is not necessarily limited to those steps or units clearly listed, but may include other steps or units that are not explicitly listed or that are inherent to such a process, a method, a product or a device.

A vehicle-mounted control unit, also known as an electronic control unit (ECU), is one of core components of a modern automotive electronics. Multiple ECUs are installed on a vehicle to be responsible for different functions. Information interaction may be performed between each ECU, and multiple ECUs form a control system of the vehicle. Usually, an ECU includes a micro controller unit (MCU), input and output interfaces, etc. The ECU and other electronic components form a brain central nervous system of the vehicle together, which processes the information sent by various sensors according to a preset program and generate a decision result, and thereby generating a control command. And then the control command is sent to an execution mechanism, and the execution mechanism executes various preset control functions.

Figure 1:
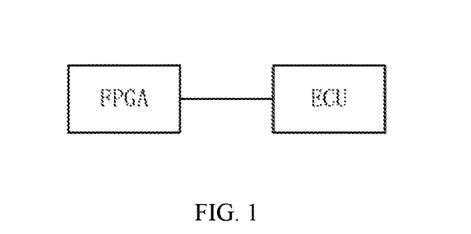
FIG. 1 is an ECU implemented based on FPGA in the prior art.

At present, each major manufacturer uses an integrated circuit (IC) to implement the ECU, and some manufacturers use field-programmable gate array (FPGA) based architectures to implement the ECU. FIG. 1 is an ECU implemented based on FPGA in the prior art. Referring to FIG. 1, the FPGA based ECU is that the FPGA is set outside of the ECU, and the FPGA is connected to the external ECU, which is suitable for the ECU without a large amount of computing requirements. However, with the evolution of technologies such as assisted driving and automatic driving, there are more and more sensors such as vehicle-mounted cameras and radars connected to the ECU, and the ECU is required to have a powerful computing capability to process data from various sensors. Among the various sensors, the data collected by the vehicle-mounted camera is the most huge and difficult to process. Moreover, the method for the current mainstream processing of the video data collected by the vehicle-mounted camera is a deep learning neural network algorithm which needs to consume huge central processing unit (CPU) resources of the ECU, that is, the ECU is needed to have strong computing power. The current FPGA based ECU uses FPGA to process the video data sent by the vehicle-mounted camera and send the processed data to the external ECU, and the external ECU performs a further process on the received data and generates a control command according to the process result, thereby completing automatic driving according to the control command.

In the above-mentioned automatic driving process, the data calculated by the FPGA needs to be further processed by the external ECU, resulting in an increased burden of the ECU.

In view of this, an embodiment of the present disclosure provides an FPGA based ECU, and the sensor data is processed by the FPGA integrated with the ARM and sent to the MCU of the ECU to reduce the burden of the MCU. Exemplarily, referring to FIG. 2.

Figure 2:
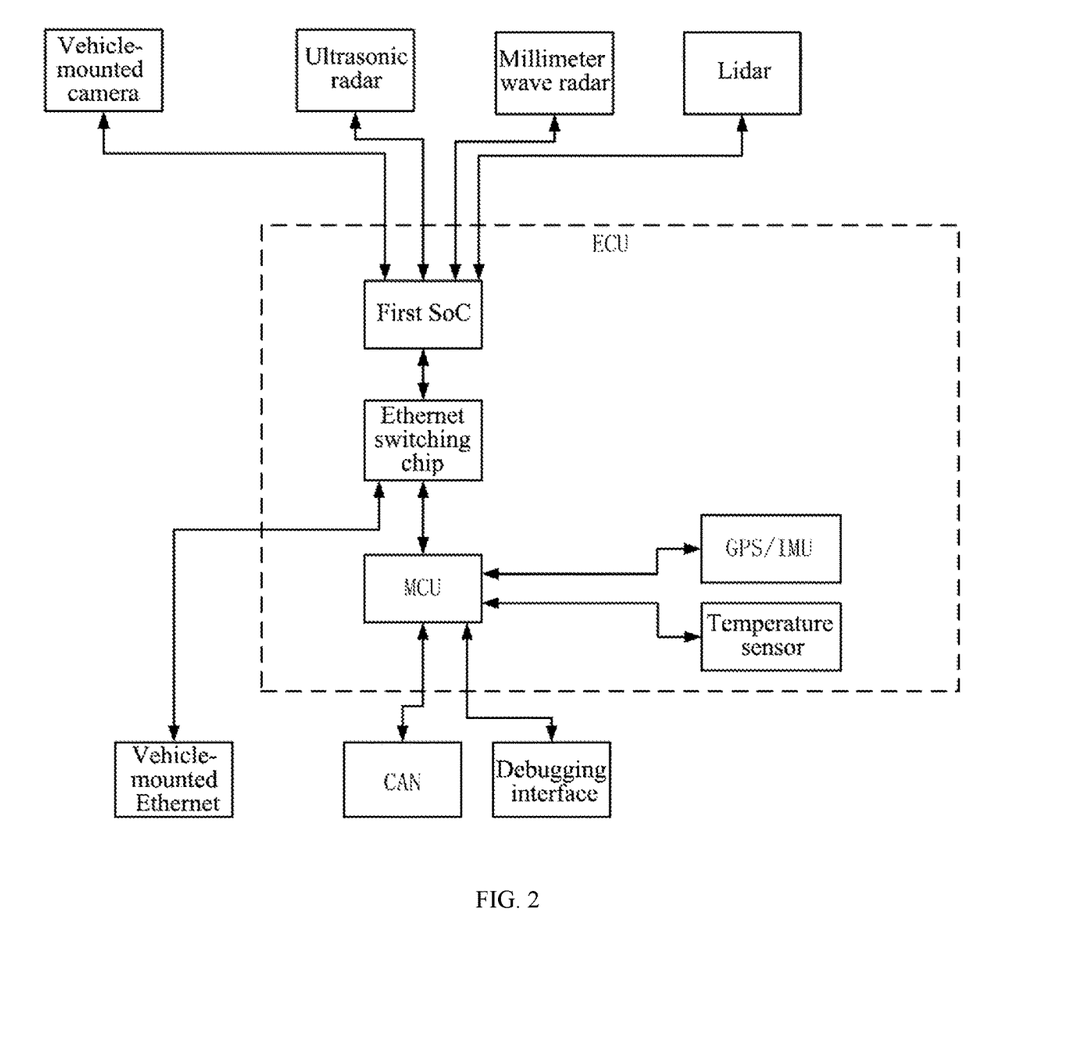
FIG. 2 is a schematic architecture diagram of a vehicle-mounted control unit provided by an embodiment of the present disclosure.

FIG. 2 is a schematic architecture diagram of a vehicle-mounted control unit provided by an embodiment of the present disclosure. Referring to FIG. 2, the vehicle-mounted control unit provided by the embodiment of the present disclosure includes: a first system on chip (SoC) and a micro controller unit (MCU), where the first SoC is integrated with an advanced reduced instruction set computer machine (ARM) through a field programmable gate array (FPGA), and the first SoC is connected to the MCU through an Ethernet switching chip.

Referring to FIG. 2, the first SoC merges the FPGA and the ARM, and encapsulates the two into a single chip, which improves the integration and reduces the data connection between the FPGA and the ARM, so that the first SoC can do more operations, improving the reliability while reducing the complexity of the ECU. The first SoC is connected to the MCU through an Ethernet switching chip, thereby implementing data exchange between the first SoC and the MCU. The Ethernet switching chip can also interact with an external vehicle-mounted Ethernet. The MCU is responsible for the function safety processing of the whole printed circuit board (PCB) of the ECU and the internal and external interfaces. The MCU internally interacts with the first SoC through the Ethernet switch chip, and a global positioning system (GPS), an inertial measurement unit (IMU), a temperature sensor and the like interact with the MCU. In terms of the external interface, the MCU leads a debugging interface a vehicle control interface. The debugging interface is mainly responsible for the debugging of the board card and the vehicle control interface achieves the control function of the vehicle.

The vehicle-mounted control unit provided by an embodiment of the present disclosure includes a MCU and a first SoC implemented by being integrated with an ARM through the FPGA, and the vehicle-mounted control unit is set on an automatic driving vehicle. During the process of the automatic driving, the FPGA of the first SoC receives video data sent by a vehicle-mounted camera; perform visual perception on the video data by using a first neural network algorithm to obtain first perception information; and sends the first perception information to the ARM of the first SoC. The ARM of the first SoC processes the first perception information to obtain first decision information and sends the first decision information to the MCU. Finally, the MCU generates a control command according to the first decision information and sends it to a corresponding execution mechanism, so that the execution mechanism performs automatic driving according to the control command. In this process, the first SoC is integrated with the ARM through the FPGA, and the sensor data is sent to the MCU after being processed by the FPGA and the ARM, so as to reduce the burden of the MCU.

Figure 3:
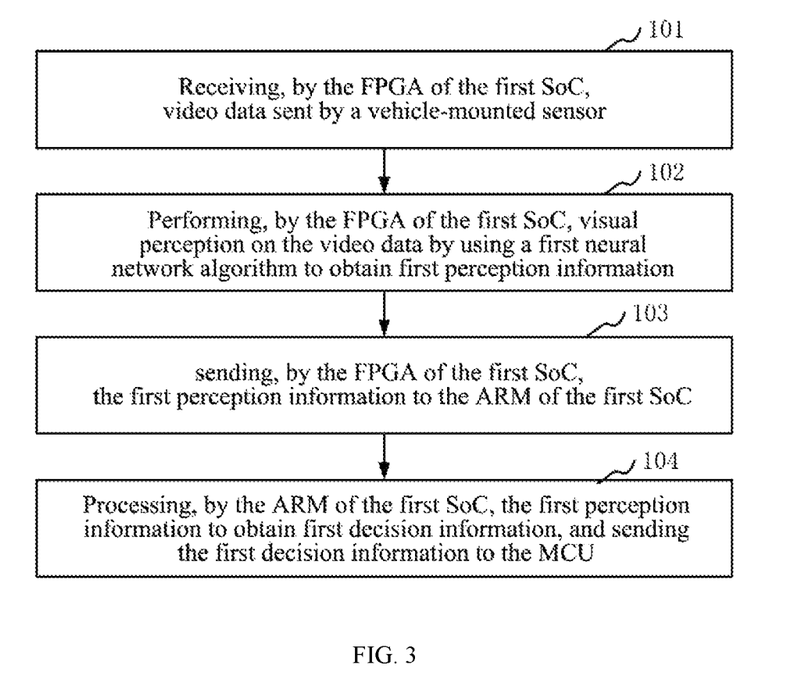
FIG. 3 is a flowchart of a method for field programmable gate array (FPGA) based automatic driving provided by an embodiment of the present disclosure.

The above-mentioned vehicle-mounted control unit is provided on an automatic driving vehicle. Hereinafter, based on FIG. 2, the method for FPGA based automatic driving provided by an embodiment of the present disclosure will be described in detail. Exemplarily, referring to FIG. 3, FIG. 3 is a flowchart of a method for field programmable gate array (FPGA) based automatic driving provided by an embodiment of the present disclosure. This embodiment includes:

101, receiving, by the FPGA of the first SoC, video data sent by a vehicle-mounted camera.

In the embodiment of the present disclosure, the vehicle-mounted control unit is provided on the automatic driving vehicle, and the vehicle-mounted control unit includes a first SoC and an MCU, and the first SoC is integrated with the ARM through the FPGA. In this step, the vehicle-mounted camera on the automatic driving vehicle collects video data and sends it to the FPGA on the first SoC. Correspondingly, the FPGA on the first SoC receives the video data.

102, performing, by the FPGA of the first SoC, visual perception on the video data by using a first neural network algorithm to obtain first perception information.

In this step, the FPGA on the first SoC uses the first neural network algorithm to perform visual perception on the received video data to obtain first perception information. Where the first neural network algorithm is a preset neural network algorithm based on deep learning, such as a convolutional neural network (CNN) algorithm, etc. For example, a time delay neural network (TDNN) algorithm, a shift-invariant artificial neural network (SIANN) algorithm, a LeNet-5 neural network algorithm, a VGGNet neural network algorithm, a GoogLeNet neural network algorithm or a ResNet Neural network algorithms, etc.

103, sending, by the FPGA of the first SoC, the first perception information to the ARM of the first SoC.

In this step, the FPGA of the first SoC sends the first perception information to the ARM of the first SoC through the FPGA internal bus.

104, processing, by the ARM of the first SoC, the first perception information to obtain first decision information, and sending the first decision information to the MCU.

In this step, the ARM of the first SoC models the environment based on the first perception information and the like, processes the first perception information by using the decision algorithm to obtain the first decision information, and then sends it to the MCU. After receiving the first decision information, the MCU generates a control command according to the first decision information and sends it to the corresponding execution mechanism, so that the execution mechanism performs automatic driving according to the control command.

The method for field programmable gate array (FPGA) based automatic driving provided by the embodiment of the present disclosure is applicable to the vehicle-mounted control unit. The vehicle-mounted control unit includes a MCU and a first SoC implemented by being integrated with an ARM through the FPGA, and the vehicle-mounted control unit is set on an automatic driving vehicle. During the process of the automatic driving, the FPGA of the first SoC receives video data sent by a vehicle-mounted camera; performs visual perception on the video data by using a first neural network algorithm to obtain first perception information; and sends the first perception information to the ARM of the first SoC. The ARM of the first SoC processes the first perception information to obtain first decision information and sends the first decision information to the MCU. Finally, the MCU generates a control command according to the first decision information and sends it to a corresponding execution mechanism, so that the execution mechanism performs automatic driving according to the control command. In this process, the first SoC is integrated with the ARM through the FPGA, and the sensor data is sent to the MCU after being processed by the FPGA and the ARM, so as to reduce the burden of the MCU.

Referring to FIG. 2 again, in the embodiment of the present disclosure, when the ARM of the first SoC processes the first perception information to obtain the first decision information and then sends it to the MCU, the ARM of the first SoC also receives radar data and merges the first perception information and radar data, and then process the merged first perception information and radar data to obtain first decision information and then sends it to the MCU. In this process, after receiving the first perception information sent by the FPGA of the first SoC, the ARM of the first SoC aggregates the first perception information and the data sent by other sensors to obtain merged data, and uses the merged data to model an environment and perform a decision process. After the first decision information is obtained, it is sent to the MCU. After receiving the first decision information, the MCU generates a control command according to the first decision information and sends it to the corresponding execution mechanism, so that the execution mechanism performs automatic driving according to the control command. Where the tactile sensor includes ultrasonic radar, millimeter wave radar, lidar, etc. Correspondingly, the data sent by the sensor includes at least one of ultrasonic radar data, millimeter wave radar data, and lidar data.

Figure 4:
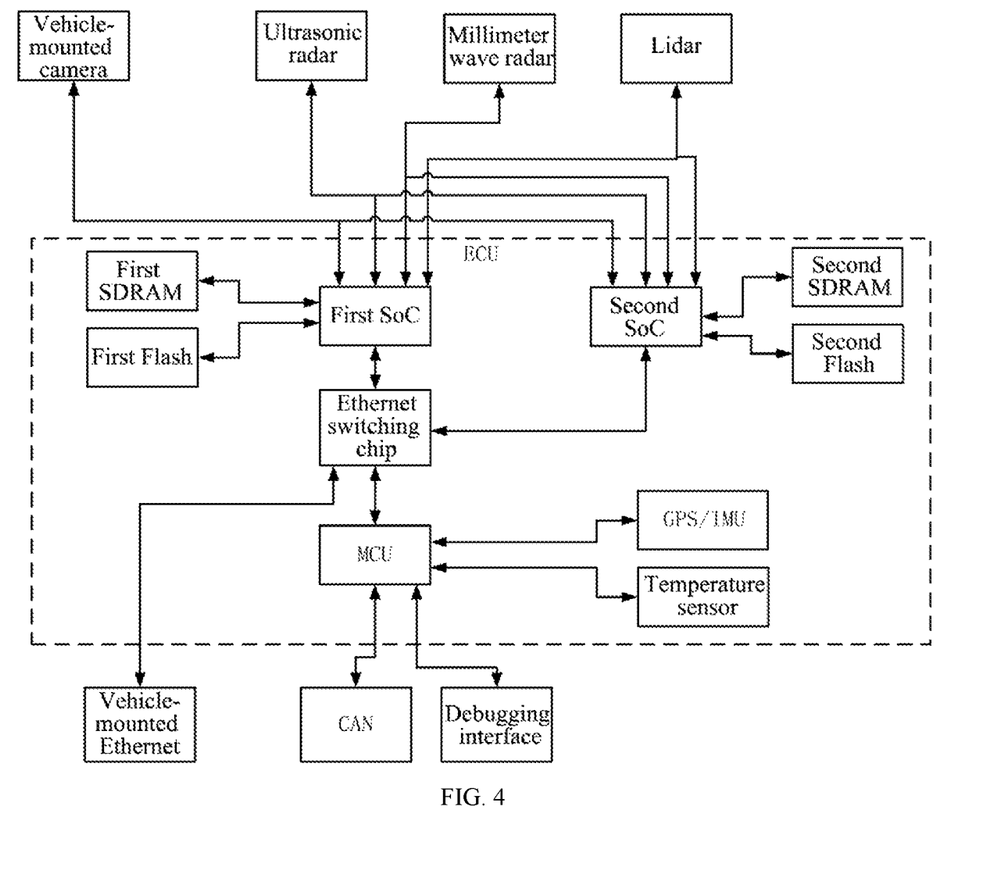
FIG. 4 is a schematic architecture diagram of another vehicle-mounted control unit provided by an embodiment of the present disclosure.

FIG. 4 is a schematic architecture diagram of another vehicle-mounted control unit provided by an embodiment of the present disclosure. Referring to FIG. 4, the vehicle-mounted control unit provided by the embodiment of the present disclosure, on the basis of the above-mentioned FIG. 2, further includes: a second SoC, which is integrated with the advanced reduced instruction set computer machine (ARM) by the FPG. In the process of automatic driving, in addition to sending the collected video data to the FPGA of the first SoC, the vehicle-mounted camera also sends the video data to the FPGA of the second SoC. After receiving the video data, the FPGA of the second SoC uses the second neural network algorithm to perform visual perception on the video data to obtain the second perception information, and then sends the second perception information to the ARM of the second SoC through the FPGA internal bus. After receiving the second perception information, the ARM of the second SoC processes the second perception information to obtain the second decision information and sends it to the MCU. In this way, the MCU will receive the first decision information sent by the ARM of the first SoC and the second decision information sent by the second SoC. The MCU compares and analyzes the two decision information to select the appropriate strategy information from them, and generates a control command according to the selected strategy information and sends it to the corresponding execution mechanism, so that the execution mechanism performs automatic driving according to the control command.

In the embodiment of FIG. 4 described above, the FPGA of the first SoC uses the first neural network algorithm to perform visual perception on the video data to obtain the first perception information; the FPGA of the second SoC uses the second neural network algorithm to perform visual perception on the video data to obtain the second perception information. Where the first neural network algorithm and the second neural network algorithm are different neural network algorithms. For example, the first neural network algorithm is a convolutional neural network algorithm, and the second neural network algorithm is a Bp algorithm. As another example, the first neural network algorithm is a time delay network algorithm, and the second neural network algorithm is a ResNet neural network algorithm.

In the embodiment of the present disclosure, a vehicle-mounted control unit architecture with a huge processing capability and highly integrated is obtained by the first SoC, the second SoC and the MCU, and a calculation of neural network algorithm on the video data is performed by using the FPGA of the first SoC and the FPGA of the second SoC. The perception information obtained through calculating the video data by each FPGA is sent to the ARM corresponding to the SoC, and the ARM merges the perception information and the radar data. Therefore, the vehicle-mounted control unit provided by the embodiment of the present disclosure has a stronger processing capability. And from the perspective of functional safety required by automotive electronic products, the first SoC and the second SoC are used to implement dual SoCs, thereby achieving a heterogeneous redundant structure, that is, the FPGA of the first SoC and the FPGA of the second SoC use different neural network algorithm to process the video data, respectively, which not only guarantees the functional safety of the vehicle-mounted control unit but also can be used as a primary and standby function.

Referring to FIG. 4 again, the vehicle-mounted control unit provided by the embodiment of the present disclosure may further include a first synchronous dynamic random access memory (SDRAM) and a first flash memory (Flash), where the first SDRAM is connected to the first SoC, and the first Flash is connected to the first SoC. Similarly, the vehicle-mounted control unit provided in the embodiment of the present disclosure may further include: a second synchronous dynamic random access memory (SDRAM) and a second flash memory (Flash), where the second SDRAM is connected to the second SoC, and the second Flash is connected to the second SoC. Based on this architecture, during the automatic driving process, after the ECU starts, the first SoC loads the program from the first Flash, and the second SoC loads the program from the second Flash. After the program is loaded, data from the vehicle-mounted cameras and other sensors are waiting to be input. For the video data collected by the vehicle-mounted camera, the FPGA of the first SoC uses the first neural network algorithm to perform visual perception on the video data to obtain first perception information; and the FPGA of the second SoC uses the second neural network algorithm to perform visual perception on the video data to obtain the second perception information. The first perception information is sent by the FPGA of the first SoC to the ARM of the first SoC. The ARM of the first SoC merges the first perception information and the detection data of various radars to obtain the first merged data, uses the first merged data to model the environment, and then generates the first decision information according to the decision algorithm and sends it to the MCU through the Ethernet switching chip. The second perception information is sent to the ARM of the second SoC by the FPGA of the second SoC. The ARM of the second SoC merges the second perception information and the detection data of various radars to obtain the second merged data, uses the second merged data to model the environment, and then generates the second decision information according to the decision algorithm and send it to the MCU through the Ethernet switching chip. After receiving the first decision information and the second decision information, the MCU analyzes and compares the two decision information to select appropriate decision information, generates a control command according to the selected decision information, and sends the control command to the execution mechanism through the vehicle control interface. The execution mechanism performs automatic driving according to the control command.

Figure 5:
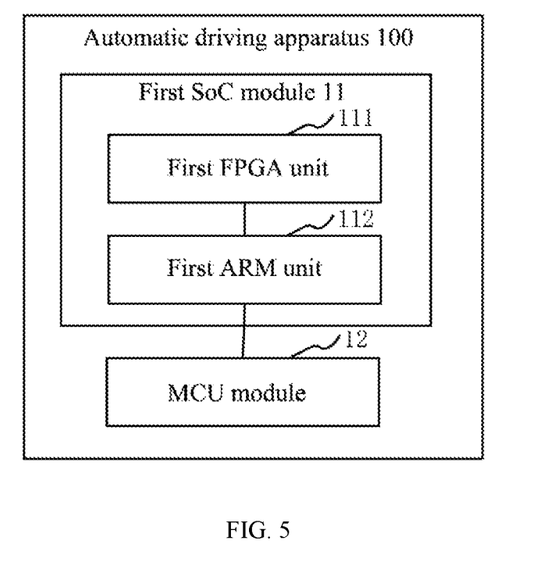
FIG. 5 is a schematic structural diagram of an automatic driving apparatus provided by an embodiment of the present disclosure.

FIG. 5 is a schematic structural diagram of an automatic driving apparatus provided by an embodiment of the present disclosure. The automatic driving device that relates to this embodiment may be a vehicle-mounted control unit, or may be a chip applied inside the vehicle-mounted control unit. The automatic driving apparatus can be used to perform the functions of the vehicle-mounted control unit in the above-described embodiment. As shown in FIG. 5, the automatic driving apparatus 100 may include: a first system on chip (SoC) module 11 and a micro control unit (MCU) module 12, where the first SoC module 11 is integrated with an advanced reduced instruction set computer machine (ARM) through the FPGA. The vehicle-mounted control unit is provided on an automatic driving vehicle, and the first SoC module 11 includes a first FPGA unit 111 and a first ARM unit 112, where, the first FPGA unit 111 is configured to receive video data sent by a vehicle-mounted camera, perform visual perception on the video data by using a first neural network algorithm to obtain first perception information, and send the first perception information to the first ARM unit 112; and the first ARM unit 112 is configured to process the first perception information to obtain the first decision information, and send it to the MCU module 12.

In a feasible design, the first ARM unit 112 is specifically configured to receive radar data, merge the first perception information and the radar data, and process the merged first perception information and the radar data to obtain the first decision information and send it to the MCU.

The automatic driving apparatus provided by the embodiment of the present disclosure is suitable for a vehicle-mounted control unit. The automatic driving apparatus includes an MCU module and a first SoC module. The first SoC module includes a first FPGA unit and a first ARM unit. During the process of the automatic driving, the first FPGA unit receives the video data sent by the vehicle-mounted camera, uses the first neural network algorithm to perform visual perception on the video data to obtain the first perception information, and sends the first perception information to the first ARM unit. The first ARM unit processes the first perception information to obtain the first decision information and sends it to the MCU module. Finally, the MCU module generates a control command according to the first decision information and sends it to the corresponding execution mechanism, so that the execution mechanism performs automatic driving according to the control command. In this process, the first SoC is integrated with the ARM through the FPGA, and the sensor data processed by the FPAG and the ARM is sent to the MCU to reduce the burden of the MCU.

Figure 6:
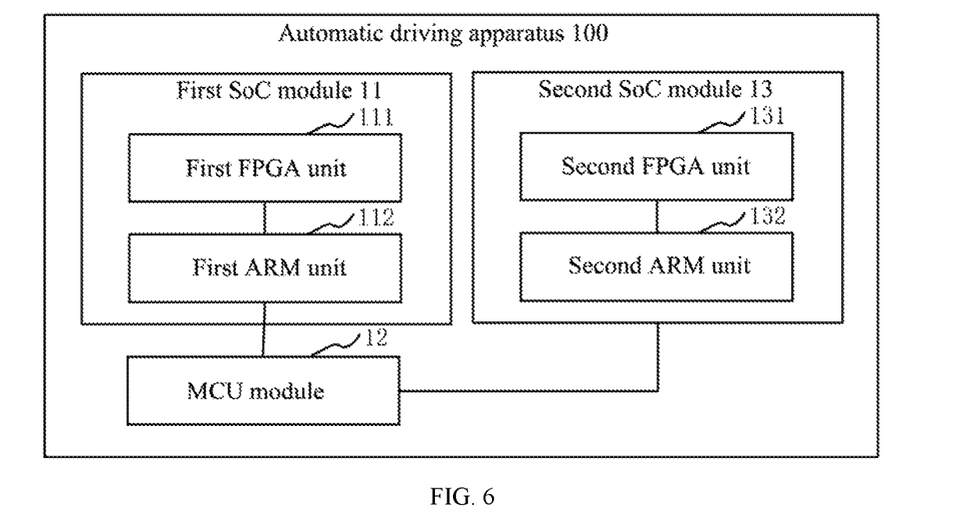
FIG. 6 is a schematic structural diagram of another automatic driving apparatus provided by an embodiment of the present disclosure.

FIG. 6 is a schematic structural diagram of another automatic driving apparatus provided by an embodiment of the present disclosure. The automatic driving apparatus 100 provided in this embodiment, on the basis of the above FIG. 5, further includes:

a second SoC module 13, where the second SoC module 13 includes a second FPGA unit 131 and a second ARM unit 132, where, the second FPGA unit 131 is configured to receive the video data sent by the vehicle-mounted camera, and perform visual perception on the video data by using a second neural network algorithm to obtain second perception information and send the second perception information to the second ARM unit 132;

the second ARM unit 132 is configured to process the second perception information to obtain the second decision information, and send it to the MCU; and the MCU module 12 is configured to generate a control command according to the first decision information and the second decision information.

An embodiment of the present disclosure further provides a storage medium, and the storage medium stores computer-executed instructions, which are used to implement the above-described field-programmable gate array (FPGA) based automatic driving method when executed by the processor.

In the above embodiments, it should be understood that the described device and method may be implemented through other manners. For example, the device embodiments described above are merely illustrative. For example, the division of the modules is only a logical function division. In an actual implementation, there may be another division manner. For example, multiple modules may be combined or integrated into another system, or some features can be ignored or not be executed. In addition, the mutual coupling or the direct coupling or the communication connection shown or discussed may be indirect coupling or a communication connection through some interfaces, apparatuses or modules, and may be electrical, mechanical or in other forms.

The modules described as separate modules may or may not be physically separate, and the components displayed as modules may or may not be physical modules, that is, they may be located in one place, or may be distributed to multiple network units. Some or all of the modules may be selected according to actual needs to achieve the purpose of the solution of the embodiment.

In addition, each function module in each embodiment of the present disclosure may be integrated into one processing unit, each module may exist separately physically, or two or more modules may be integrated into one unit. The above integrated modules may be implemented in the form of hardware or may be implemented in the form of hardware and software function units.

The above integrated modules implemented in the form of software function modules may be stored in a computer-readable storage medium. The above software function modules are stored in a storage medium, and include several instructions to enable an electronic device (which may be a personal computer, a server, or a network device, etc.) or a processor to perform part steps of the method of each of the embodiments of the present disclosure.

It should be understood that the above processor may be a central processing unit (CPU), and may also be other general-purpose processor, digital signal processor (DSP), and application specific integrated circuits (ASIC), etc. The general-purpose processor may be a microprocessor or the processor may be any conventional processor and the like. In conjunction with the steps of the method disclosed by the present disclosure, they can be directly embodied as being executed and completed by a hardware processor, or being executed and completed by a combination of hardware and software modules in the processor.

The memory may include a high-speed random access memory (RAM), or may also include a non-volatile storage (NVM), for example, at least one magnetic disk memory, and may also be a U disk, a mobile hard disk, a read-only memory, a magnetic disk, or an optical disk and the like.

The bus may be an industry standard architecture (ISA) bus, an peripheral component interconnection (PCI) bus, or an extended industry standard architecture (EISA) bus and on the like. The bus can be divided into an address bus, a data bus, a control bus and the like. For ease of representation, the bus in the drawings of the present disclosure does not limit to only one bus or one type of bus.

The above storage medium may be implemented by any type of volatile or non-volatile storage device or a combination thereof, such as a static random access memory (SRAM), an electrically erasable programmable read only memory (EEPROM), an erasable programmable read only memory (EPROM), a programmable read only memory (PROM), a read only memory (ROM), a magnetic memory, a flash memory, a magnetic disk or an optical disk. The storage medium may be any available medium that can be accessed by a general-purpose or a special-purpose computer.

An exemplary storage medium is coupled to the processor so that the processor can read information from the storage medium and can write information to the storage medium. Of course, the storage medium may also be a component of the processor. The processor and the storage medium may be located in an application specific integrated circuit (ASIC). Of course, the processor and the storage medium may also exist in a terminal or a server as discrete components.

In the above embodiments, it can be implemented in whole or in part by software, hardware, firmware, or any combination thereof. When implemented using software, it can be implemented in whole or in part in the form of a computer program product. The computer program product includes one or more computer instructions. When the computer program instructions are loaded and executed on the computer, the processes or functions according to the embodiments of the present disclosure are generated in whole or in part. The computer may be a general-purpose computer, a dedicated computer, a computer network, or other programmable apparatus. Computer instructions can be stored in a computer-readable storage medium or transferred from one computer-readable storage medium to another computer-readable storage medium. For example, computer instructions can be transmitted from a website site, a computer, a server or a data center to another website site, computer, server or data center by wire (such as coaxial cable, optical fiber, digital subscriber line (DSL)) or wireless (such as infrared, wireless, microwave and the like.). The computer-readable storage medium may be any available medium that can be accessed by a computer or a data storage device including one or more available medium integrated servers, data centers, and the like. The available medium may be a magnetic medium (for example, a floppy disk, a hard disk, a magnetic tape), an optical medium (for example, a DVD), or a semiconductor medium (for example, a solid state disk, SSD), and the like.

The term "plurality" herein refers to two or more. The term "and/or" herein is only an association relationship that describes an associated object, which indicates that there can be three relationships, for example, A and/or B, which may represent three cases: A exists alone, and A and B exist at the same time, and B exist alone. In addition, the character "/" herein generally indicates that the related object is a relationship of "or"; in the formula, the character "/" indicates that the related object is a relationship of "divide".

Those of ordinary skilled in the art may understand that all or part of the steps of the above method embodiments may be completed by hardware relevant with program instruction. The foregoing program may be stored in a computer-readable storage medium. When the program is executed, the steps including the above method embodiments are executed; and the foregoing storage medium includes various media that can store program codes, such as a ROM, a RAM, a magnetic disk, or an optical disk.

Finally, it should be noted that the above embodiments are only used to illustrate the technical solutions of the present disclosure, rather than limiting them; although the present disclosure has been described in detail with reference to the foregoing embodiments, those of ordinary skilled in the art should understand that: the technical solutions recorded in the foregoing embodiments can still be modified, or some or all of the technical features can be equivalently replaced; and these modifications or substitutions do not deviate the essence of the corresponding technical solutions from the scope of the technical solutions of the embodiments of the present disclosure.

What is claimed is:

1. A method for field programmable gate array (FPGA) based automatic driving of a vehicle, suitable for a vehicle-mounted control unit, wherein the vehicle-mounted control unit comprises a first system on chip (SoC), a second SoC and a micro control unit (MCU),
   wherein the first SoC is integrated with a first advanced reduced instruction set computer machine (ARM) through a first FPGA, the first FPGA and the first ARM are encapsulated in the first SoC, and the vehicle-mounted control unit is set on an automatic driving vehicle, wherein the method comprises:
   receiving, by the first FPGA of the first SoC, video data sent by a vehicle-mounted camera;

performing, by the first FPGA of the first SoC, visual perception on the video data by using a first neural network algorithm to obtain first perception information;

sending, by the first FPGA of the first SoC, the first perception information to the first ARM of the first SoC; and processing, by the first ARM of the first SoC, the first perception information to obtain first decision information, and sending the first decision information to the MCU;

wherein the second SoC is integrated with a second ARM through a second FPGA, the second FPGA and the second ARM are encapsulated in the second SoC, and the method further comprises:

receiving, by the second FPGA of the second SoC, the video data sent by the vehicle-mounted camera;

performing, by the second FPGA of the second SoC, visual perception on the video data by using a second neural network algorithm to obtain second perception information;

sending, by the second FPGA of the second SoC, the second perception information to the second ARM of the second SoC;

processing, by the second ARM of the second SoC, the second perception information to obtain second decision information, and sending the second decision information to the MCU; and generating, by the MCU, a control command according to the first decision information and the second decision information;

wherein generating, by the MCU, the control command according to the first decision information and the second decision information comprises:

comparing and analyzing, by the MCU, the first decision information and the second decision information to select an appropriate strategy information; and generating, by the MCU, the control command according to the appropriate strategy information selected.

2. The method according to claim 1, wherein the processing, by the ARM of the first SoC, the first perception information to obtain first decision information, and sending the first decision information to the MCU comprises:

receiving radar data by the ARM of the first SoC;

merging, by the ARM of the first SoC, the first perception information and the radar data; and processing, by the ARM of the first SoC, the merged first perception information and the radar data to obtain the first decision information, and sending the first decision information to the MCU.

3. The method according to claim 2, wherein the radar data comprises at least one of ultrasonic radar data, millimeter wave radar data, and lidar data.

4. A vehicle-mounted control unit, comprising: a first system on chip (SoC), a second SoC, and a micro control unit (MCU), wherein the first SoC and the second SoC are respectively integrated with an advanced reduced instruction set computer machinate array (ARM) through a field programmable gate array (FPGA), and the first SoC and the second SoC are connected to the MCU through an Ethernet switching chip;

wherein the first SoC comprises a first FPGA unit and a first ARM unit, and the first unit FPGA and the first ARM unit are encapsulated in the first SoC, the first FPGA unit is configured to receive video data sent by a vehicle-mounted camera, perform visual perception on the video data by using a first neural network algorithm to obtain first perception information, and send the first perception information to the first ARM unit of the first SoC; and the first ARM unit is configured to process the first perception information to obtain first decision information, and send the first decision information to the MCU;

wherein the second SoC comprises a second FPGA unit and a second ARM unit, and the second FPGA unit and the second ARM unit are encapsulated in the second SoC, the second FPGA unit is configured to receive the video data sent by the vehicle-mounted camera, perform visual perception on the video data by using a second neural network algorithm to obtain second perception information, and send the second perception information to the second ARM unit of the second SoC; and the second ARM unit is configured to process the second perception information to obtain second decision information, and send the second decision information to the MCU;

wherein the MCU is configured to compare and analyze the first decision information and the second decision information to select an appropriate strategy information;

the MCU is further configured to generate a control command according to the appropriate strategy information selected.

5. The vehicle-mounted control unit according to claim 4, wherein the first ARM unit is configured to receive radar data, merge the first perception information and the radar data, process the merged first perception information and the radar data to obtain first decision information, and send the first decision information to the MCU.

6. The vehicle-mounted control unit according to claim 5, wherein the radar data comprises at least one of ultrasonic radar data, millimeter wave radar data, and lidar data.

7. The vehicle-mounted control unit according to claim 4, further comprising:

a first synchronous dynamic random access memory (SDRAM) and a first flash memory (Flash), wherein the first SDRAM is connected to the first SoC, and the first Flash is connected to the first SoC.

8. An automatic driving apparatus, wherein the apparatus is suitable for a vehicle-mounted control unit, and the automatic driving apparatus comprises: a first system on chip (SoC) module, a second SoC module, and a micro control unit (MCU) module, the first SoC module and the second SoC module are respectively integrated with an advanced reduced instruction set computer machine (ARM) through a field programmable gate array (FPGA), the vehicle-mounted control unit is set on an automatic driving vehicle, wherein the first SoC module comprises a first FPGA unit and a first ARM unit, and the first FPGA unit and the first ARM unit are encapsulated in the first SoC module, the first FPGA unit is configured to receive video data sent by a vehicle-mounted camera, perform visual perception on the video data by using a first neural network algorithm to obtain first perception information, and send the first perception information to the first ARM unit of the first SoC module; and the first ARM unit is configured to process the first perception information to obtain first decision information, and send the first decision information to the MCU module;

wherein the second SoC module comprises a second FPGA unit and a second ARM unit, and the second FPGA unit and the second ARM unit are encapsulated in the second SoC module, the second FPGA unit is configured to receive the video data sent by the vehicle-mounted camera, perform visual perception on the video data by using a second neural network algorithm to obtain second perception information, and send the second perception information to the second ARM unit of the second SoC module; and the second ARM unit is configured to process the second perception information to obtain second decision information, and send the second decision information to the MCU module;

wherein the MCU module is configured to compare and analyze the first decision information and the second decision information to select an appropriate strategy information;

the MCU module is further configured to generate a control command according to the appropriate strategy information selected.

9. The apparatus according to claim 8, wherein the first ARM unit is configured to receive radar data, merge the first perception information and the radar data, process the merged first perception information and the radar data to obtain first decision information, and send the first decision information to the MCU.

10. The apparatus according to claim 8, wherein the radar data comprises at least one of ultrasonic radar data, millimeter wave radar data, and lidar data.

* * * * *